Figure 1:
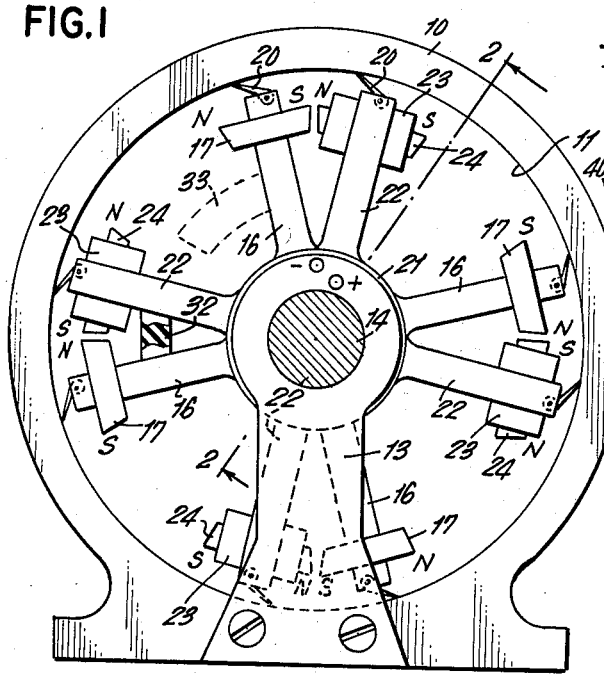

Feb. 18, 1964

A. MacARTHUR 3,121,812

STEP MOTOR

Filed Nov. 25, 1960

INVENTOR.
ARTHUR MacARTHUR
BY *Albert F. Kronman*
ATTORNEY

United States Patent Office 3,121,812
Patented Feb. 18, 1964

3,121,812
STEP MOTOR
Arthur MacArthur, 14 Whitehall Road,
East Brunswick, N.J.
Filed Nov. 25, 1960, Ser. No. 71,583
9 Claims. (Cl. 310—49)

This invention relates to a step motor having an electromagnet and a permanent magnet with mechanical arrangements for providing motion for both magnets. The invention has particular reference to an electric motor which moves by steps, first one series of elements moving one step, and then a second series of elements moving a complementary step. Continued application of direct current power produces continuous rotation of a driven shaft coupled to the moving elements by a mechanical coupling means.

Several types of step motors have been designed and manufactured for applications where a single small rotational step was desired. All such motors include a moving element, or rotor, and an element secured to the motor frame, or stator. The present motor has no stator, all active components being rotatable and moving in the same direction when connected to a source of direct current power. The absence of a stator produces a new concept in the motor field and has many advantages including the absence of heat generating equipment secured to a unitary frame and thereby providing a source of heat which may be a disadvantage to other components. In the present invention, all the heat generated is produced in windings which revolve in the open air and for this reason may be run at higher temperatures and produce more mechanical power.

One of the objects of this invention is to provide an improved step motor which avoids one or more of the disadvantages and limitations of prior art arrangements.

Another object of the invention is to provide a motor which advances a driven shaft by a series of incremental steps.

Another object of the invention is to reduce the price of small motors.

A further object of the invention is to provide a more electrically efficient stepper motor.

Another object of the invention is to provide additional air cooling to the parts of a direct current motor.

The invention includes a direct current step motor having a first rotatable element mounted on a shaft with coupling means for driving the shaft in one direction. The first rotatable element includes one or more permanent magnets mounted on arms for motion around the shaft. A second rotatable element is also mounted on the shaft with coupling means for moving the shaft in the same direction. The second element includes one or more electromagnets mounted for rotation about the shaft and arranged so that the magnetic fields of both sets of magnets are interjoined to produce a mechanical force. A contact means is secured to the first and second elements for applying direct current to the electromagnets. The current is applied in one direction when the magnets are separated and in the reverse direction when the magnets are close to each other.

For a better understanding of the present invention, together with other and further objects thereof, reference is made to the following description taken in connection with the accompanying drawings.

Figure 2:
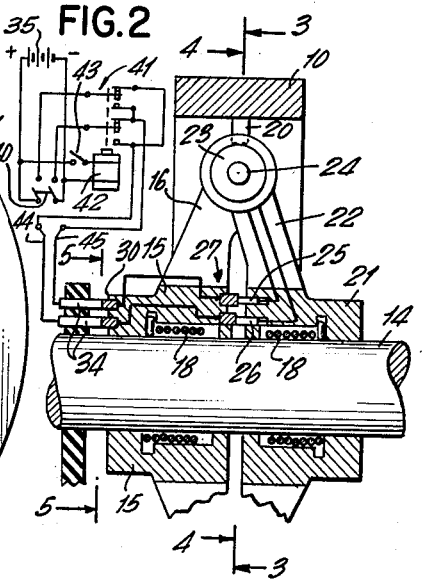
Figure 3:
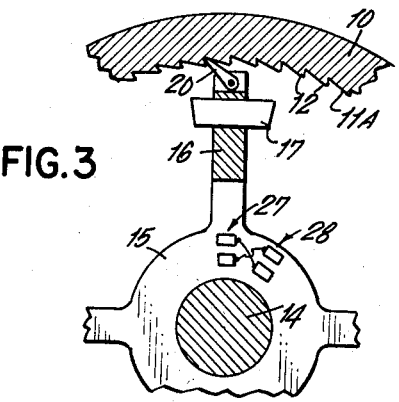
Figure 4:
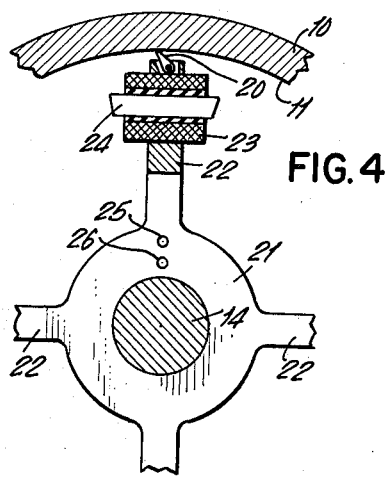
Figure 5:
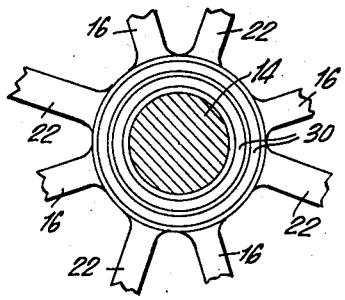

FIGURE 1 is a side view of the step motor.
FIGURE 2 is a partial cross sectional view taken along line 2—2 of FIGURE 1 and showing the details of the shaft coupling means and the contact means.
FIGURE 3 is a cross sectional view of the motor shown in FIGURE 2 and is taken along 3—3 of that figure looking in the direction of the arrows. This view shows an alternate arrangement of ratchet teeth and a pawl for preventing the reverse movement of the rotatable elements.
FIGURE 4 is a cross sectional view similar to FIGURE 3 but taken along line 4—4 of FIGURE 2, looking in the direction of the arrows.
FIGURE 5 is a partial cross sectional view taken along line 5—5 of FIGURE 2 looking in the direction of the arrows and showing the slip rings for connection to a direct current power source.

Referring now to the figures, the step motor includes a frame 10 having an interior surface 11 which is employed to act as a ratchet means in cooperation with one or more pawls 20 to prevent the reverse movement of the rotatable elements in the motor. The surface 11 may be smooth as shown in some of the figures, or it may have ratchet teeth 12 as shown in FIGURE 3. Mounted on the frame 10 are two end pieces 13 which support a rotatable shaft 14. The shaft may be coupled to any utilization device for producing rotation. Rotatably mounted on the shaft 14 is a first rotatable element 15 which includes one or more outwardly extending arms 16. Each arm supports a permanent magnet 17 near its outer end, this magnet being used as a source of magnetic flux for producing mechanical force as shown in FIGURE 1, successive magnets 17 are disposed with their poles in opposite orientation. The element 15 is provided with a mechanical coupling means which permits its rotation with the shaft 14 only in one direction. This coupling means may be a series of ratchet teeth and a pawl or it may be a "no back" spring 18 as shown in FIGURE 2. These springs are closely wound around the shaft with one end secured to the element 15. They are wound in such a way that when the element 15 is moved in one direction the spring is tightened around the shaft and pulls the shaft along with the element. When the motion is in the other direction, the spring is loosened and the two can move independently of each other.

At the outer end of arm 16 a pawl 20 is mounted and stressed by a spring (not shown) to maintain contact on the inner surface 11 of the frame 10. This pawl 20 prevents reverse motion of element 15 and permits it to move in one direction only, as shown in FIGURE 1 this movement is in a clockwise direction.

A second rotatable element 21 is mounted on shaft 14 and includes one or more arms 22. Near the ends of the arms 22 an electromagnet is mounted having a winding 23 and a core 24. The arrangement of arms is such that the permanent magnets 17 and the cores 24 all rotate in the same plane, this plane being transverse to the axis of the shaft 14 and disposed at right angles to it.

The ends of winding 23 are connected to two brushes 25 and 26 (see FIGURE 2). These brushes are mounted on one of the faces of rotatable element 21 opposite a similar face on rotatable element 15. On element 15 four contact segments are secured, one pair of segments 27 is arranged for contact with brushes 25 and 26 when the two rotatable elements are a predetermined distance from each other. A second pair of contacts 28 is mounted for contact with brushes 25 and 26 when the two rotatable elements have been rotated in relation to each other so that the permanent magnets and the electromagnets are adjacent to each other. As shown in FIGURE 2, one pair of contacts 27 is connected to a pair of slip rings 30 (also shown in FIGURE 5) which cooperate with brushes 34 and a source of electrical power 35. Contacts 27 and 28 are interconnected to each other, as shown in FIGURE 3 so that in one position, the current flowing through the contacts 27 and the brushes 25, 26 will apply direct current to winding 23 in one direction to produce a flux in core 24 which will attract the permanent magnet 17 and draw the two magnets and their arms together. At the same time and due to the reverse polarity of every other electro and permanent magnets there will be a repulsion further contributing to the force driving the arms. When the magnets are drawn together, brushes 25 and 26 make contact with contacts 28 which apply current through the brushes and winding 23 in the reverse direction and thereby set up a reverse flux in core 24 which again drives the arms. Referring again to FIGURE 1 the operation of the stepper motor will be clear. Assuming the electromagnet supporting arms 22 to be stationary, that is, held by the pawls 20, the gaps between unlike poles will have an attraction while those between the like poles will have a repulsion. Due to the alternately reversed polarity of the successive permanent magnets and electro magnets there will be an additive effect resulting in the clockwise motion of the arms 16 holding the permanent magnets to the position shown in FIGURE 1. At this instant the brushes 25 and 26 will make contact with contacts 28 to reverse the direction of the current in the winding 23. The arrangement of the magnets will cause the permanent magnet bearing arms 16 to remain stationary and the electromagnets to move in a clockwise direction toward them under the additive effect of magnetc attraction and repulsion.

From the above it will be evident that arms 16 and 22 move by increments in a clockwise direction and that these motions are transferred to shaft 14 by means of the one way springs 18. In order to prevent the ends of the pole pieces from coming in contact with each other, a resilient stop 32 may be mounted on one of the arms 16 in such a manner that it will make contact with one of the arms 22 in the position shown in FIGURE 1. A similar stop 33, shown in dotted lines in FIGURE 1 may be employed to arrest the motion of element 21 and its arms 22, but such a stop has been found unnecessary and need not be used.

The above description has been directed to a continuously operating step motor which is the preferred embodiment of the invention. There may be times, however, when conditions call for a step-by-step motor to operate by increments under control of a manual switch. The present structure can easily be arranged for such operation and the alternate circuit shown in FIGURE 2 is for this purpose. First, the cross connections between contacts 27 and 28 are changed so that the outer contacts are joined to each other and the inner contacts are also connected. The result of this change is that there will be no polarity reversal as the electromagnets move relative to the permanent magnets.

The alternate circuit includes a double-pole, double-throw switch 40 (FIGURE 2) which can be moved to the lower contact position to operate the motor continuously as described above. When moved to the upper contact position the battery 35 is connected to two relay contacts forming part of a reversing switch 41 operated by a relay winding 42, connected to the battery 35 in series with a switch 43. The operation of this circuit is as follows: With switch 40 in its upper position, and switch 43 open, current from battery 35 is applied through contacts 41 making conductor 44 positive and conductor 45 negative. This current flows through contacts 27 and 28, brushes 25 and 26, and windings 23 to magnetize core 24 and produce a force between this core and magnet 17 (either attraction or repulsion). This force causes a single relative movement between the two rotors. When switch 43 is closed, the relay winding 42 receives current from the battery and switch 41 is operated, making conductor 45 positive and conductor 44 negative. Current then flows through coil 23 and produces an opposite force between the two cores 17 and 24, causing another single relative movement between the two rotors. Continued opening and closing of switch 43 causes a series of step movements in the rotors and both move around the shaft axis in increments under control of the operator.

The foregoing disclosure and drawings are merely illustrative of the principles of this invention and are not to be interpreted in a limiting sense. It will be obvious from the above description that the slip rings 30 may be secured to rotatable element 21 and the brushes and contacts 25 and 27 may be interchanged in their position.

Having thus fully described the invention, what is claimed as new and desired to be secured by Letters Patent of the United States is:

1. A direct current step motor comprising a motor frame, a rotatably mounted shaft in said frame, a first rotatable element on the shaft, at least one arm on the first rotatable element extending outwardly thereof in the direction of the frame, a permanent magnet mounted on said arm, a first clutch for transferring the motion of the first rotatable element to the shaft, a second rotatable element on the shaft, at least one arm on the second rotatable element extending outwardly thereof in the direction of the frame, an electromagnet mounted on the said arm, a second clutch for transferring the motion of the second element to the shaft, said permanent magnet and said electromagnet being mounted in substantially the same plane and normal to the shaft axis so that their magnetic fields are interjoined, contact means connected to a source of direct current power and the electromagnet for applying current pulses to the electromagnet and means operated by the movement of the rotatable elements to reverse the polarity of the electromagnet to drive the rotatable elements and the shaft.

2. A direct current step motor comprising a motor frame, a rotatably mounted shaft in said frame, a first rotatable element on the shaft, means to limit the rotation of the first rotatable element to a single direction, at least one arm on the first rotatable element extending outwardly thereof in the direction of the frame, a permanent magnet mounted on said arm, a first clutch for transferring the motion of the first rotatable element to the shaft, a second rotatable element on the shaft, means to limit the rotation of the second rotatable element to the same direction as the first element, at least one arm on the second rotatable element extending outwardly thereof in the direction of the frame, an electromagnet mounted on the said arm, a second clutch for transferring the motion of the second element to the shaft, said permanent magnet and said electromagnet being mounted in substantially the same plane and normal to the shaft axis so that their magnetic fields are interjoined, contact means connected to a source of direct current power and the electromagnet for applying current pulses to the electromagnet and means operated by the movement of the rotatable elements to reverse the polarity of the electromagnet to drive the rotatable elements and the shaft.

3. A direct current step motor comprising a motor frame, a rotatably mounted shaft in said frame, a first rotatable element on the shaft, a plurality of radially extending arms on the first rotatable element extending outwardly thereof in the direction of the frame, a permanent magnet mounted on each of said arms, a first clutch for transferring the motion of the first rotatable element to the shaft, a second rotatable element on the shaft, a plurality of radially extending arms on the second rotatable element extending outwardly thereof in the direction of the frame, an electromagnet mounted on each of the said arms, a second clutch for transferring the motion of the second element to the shaft, said permanent magnets and said electromagnets being mounted in substantially the same plane and normal to the shaft axis so that their magnetic fields are interjoined, contact means connected to a source of direct current power and the electromagnets for applying current pulses to the electromagnets and means operated by the movement of the rotatable elements to reverse the polarity of the electromagnets to drive the rotatable elements and the shaft.

4. A direct current step motor comprising a motor frame, a rotatably mounted shaft in said frame, a first rotatable element on the shaft, means to limit the rotation of the first rotatable element to a single direction, a plurality of radially extending arms on the first rotatable element extending outwardly thereof in the direction of the frame, a permanent magnet mounted on each of said arms, a first clutch for transferring the motion of the first rotatable element to the shaft, a second rotatable element on the shaft, means to limit the rotation of the second rotatable element to the same direction as the first element, a plurality of radially extending arms on the second rotatable element extending outwardly thereof in the direction of the frame, an electromagnet mounted on each of said arms, a second clutch for transferring the motion of the second element to the shaft, said permanent magnets and said electromagnets being mounted in substantially the same plane and normal to the shaft axis so that their magnetic fields are interjoined, contact means connected to a source of direct current power and the electromagnets for applying current pulses to the electromagnets and means operated by the rotatable elements to reverse the polarity of the electromagnets to drive the rotatable elements and the shaft.

5. A motor according to claim 4 in which successive permanent magnets and electromagnets are disposed with their poles in opposite orientation.

6. A motor according to claim 4 in which the rotation limiting means comprise pawls carried by the arms and engaging the inside of the frame.

7. A motor according to claim 4 in which the rotation limiting means comprise pawls carried by the arms and a plurality of ratchet teeth on the inside of the frame and engaged by the pawls and engaging the inside of the frame.

8. A motor according to claim 4 in which said clutches each comprise a spring wound upon the shaft and having one end thereof secured to one of the rotatable elements.

9. A direct current step motor comprising a motor frame, a rotatably mounted shaft in said frame, a first rotatable element on the shaft, at least one arm on the first rotatable element extending outwardly thereof in the direction of the frame, a permanent magnet mounted on said arm, coupling means for transferring the motion of the first rotatable element to the shaft, a second rotatable element on the shaft, at least one arm on the second rotatable element extending outwardly thereof in the direction of the frame, an electromagnet mounted on the said arm, coupling means for transferring the motion of the second element to the shaft, said permanent magnet and said electromagnet being mounted in substantially the same plane and normal to the shaft axis so that their magnetic fields are interjoined, contact means connected to a source of direct current power and the electromagnet for applying current pulses to the electromagnet and means to reverse the polarity of the electromagnet to drive the rotatable elements and the shaft, said means including a reversing switch connected between the source of power and the electromagnet and operated by said rotatable elements.

References Cited in the file of this patent

UNITED STATES PATENTS

| | | |
|---|---|---|
| 694,778 | Perret | Mar. 4, 1902 |
| 1,080,161 | Pace et al. | Dec. 2, 1913 |
| 2,964,662 | King | Dec. 13, 1960 |

UNITED STATES PATENT OFFICE
CERTIFICATE OF CORRECTION

Patent No. 3,121,812                      February 18, 1964

Arthur MacArthur

It is hereby certified that error appears in the above numbered patent requiring correction and that the said Letters Patent should read as corrected below.

In the heading to the printed specification, lines 3 and 4, for "14 Whitehall Road, East Brunswick, N. J." read -- East Brunswick, N. J. (R.F.D. #2, Malvern, Pa.) --.

Signed and sealed this 30th day of June 1964.

(SEAL)
Attest:

ERNEST W. SWIDER
Attesting Officer

EDWARD J. BRENNER
Commissioner of Patents